US009883088B2

United States Patent
Winden et al.

(10) Patent No.: US 9,883,088 B2
(45) Date of Patent: Jan. 30, 2018

(54) METHOD OF ASSEMBLING CAMERA FOR VEHICLE VISION SYSTEM

(71) Applicant: MAGNA ELECTRONICS INC., Auburn Hills, MI (US)

(72) Inventors: Brian J. Winden, Waterford, MI (US); Robert A. Devota, Durand, MI (US); Matthew C. Sesti, Williamston, MI (US); Joseph A. Stemmer, Warren, MI (US); Steven V. Byrne, Goodrich, MI (US); John R. Garcia, Montrose, MI (US); David F. Olson, Lapeer, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 15/494,648

(22) Filed: Apr. 24, 2017

(65) Prior Publication Data
US 2017/0230554 A1    Aug. 10, 2017

Related U.S. Application Data

(63) Continuation of application No. 15/349,012, filed on Nov. 11, 2016, now Pat. No. 9,635,230, which is a
(Continued)

(51) Int. Cl.
*H04N 5/00* (2011.01)
*H04N 5/225* (2006.01)
(Continued)

(52) U.S. Cl.
CPC .............. *H04N 5/2254* (2013.01); *C09J 5/00* (2013.01); *C09J 163/00* (2013.01);
(Continued)

(58) Field of Classification Search
CPC .... H04N 5/2254; H04N 5/2253; C09J 163/00
(Continued)

(56) References Cited

U.S. PATENT DOCUMENTS

| 4,514,530 A | 4/1985 | Sellstrom |
| 4,712,879 A | 12/1987 | Lynam et al. |

(Continued)

FOREIGN PATENT DOCUMENTS

| CN | 1743887 | 3/2006 |
| CN | 01059596 | 10/2007 |

(Continued)

*Primary Examiner* — Jeffery Williams
(74) *Attorney, Agent, or Firm* — Gardner, Linn, Burkhart & Flory, LLP

(57) ABSTRACT

A method of assembling a camera suitable for vehicular use includes providing a lens accommodated in a lens barrel, a camera front housing, and a printed circuit board with an imager disposed thereat. An adhesive is dispensed to establish a layer of uncured adhesive one of (i) between the lens barrel and a front portion of the camera front housing and (ii) between the printed circuit board and a rear portion of the camera front housing. With the lens in focus with the imager and optically center-aligned therewith, the adhesive is initially cured to an initially-cured state in an initial radiation curing process that includes exposure to UV light for a first period of time. The initially-cured adhesive is further cured to a further-cured state in a secondary curing process. The further-cured state is achieved within a second period of time that is longer than the first period of time.

34 Claims, 8 Drawing Sheets

Related U.S. Application Data continuation of application No. 15/268,940, filed on Sep. 19, 2016, now Pat. No. 9,497,368, which is a continuation of application No. 14/535,739, filed on Nov. 7, 2014, now Pat. No. 9,451,138.

(60) Provisional application No. 61/905,462, filed on Nov. 18, 2013, provisional application No. 61/901,127, filed on Nov. 7, 2013.

(51) Int. Cl.
   *C09J 163/00* (2006.01)
   *C09J 5/00* (2006.01)

(52) U.S. Cl.
   CPC ......... *H04N 5/2252* (2013.01); *H04N 5/2253* (2013.01); *C09J 2463/00* (2013.01)

(58) Field of Classification Search
   USPC ...................................................... 348/148
   See application file for complete search history.

(56) References Cited

U.S. PATENT DOCUMENTS

| | | |
|---|---|---|
| 4,786,966 A | 11/1988 | Hanson et al. |
| 5,073,012 A | 12/1991 | Lynam |
| 5,076,673 A | 12/1991 | Lynam et al. |
| 5,115,346 A | 5/1992 | Lynam |
| 5,140,455 A | 8/1992 | Varaprasad et al. |
| 5,142,407 A | 8/1992 | Varaprasad et al. |
| 5,151,816 A | 9/1992 | Varaprasad et al. |
| 5,253,109 A | 10/1993 | O'Farrell et al. |
| 5,371,659 A | 12/1994 | Pastrick et al. |
| 5,406,414 A | 4/1995 | O'Farrell et al. |
| 5,497,306 A | 3/1996 | Pastrick |
| 5,525,264 A | 6/1996 | Cronin et al. |
| 5,550,677 A | 8/1996 | Schofield et al. |
| 5,559,556 A | 9/1996 | Kagebeck |
| 5,567,360 A | 10/1996 | Varaprasad et al. |
| 5,610,756 A | 3/1997 | Lynam et al. |
| 5,657,539 A * | 8/1997 | Orikasa ............ B23K 26/08 219/121.71 |
| 5,668,663 A | 9/1997 | Varaprasad et al. |
| 5,669,699 A | 9/1997 | Pastrick et al. |
| 5,670,935 A | 9/1997 | Schofield et al. |
| 5,724,187 A | 3/1998 | Varaprasad et al. |
| 5,760,962 A | 6/1998 | Schofield et al. |
| 5,796,094 A | 8/1998 | Schofield et al. |
| 5,821,532 A | 10/1998 | Beaman et al. |
| 5,823,654 A | 10/1998 | Pastrick et al. |
| 5,854,708 A | 12/1998 | Komatsu et al. |
| 5,872,332 A | 2/1999 | Verma |
| 5,877,897 A | 3/1999 | Schofield et al. |
| 5,910,854 A | 6/1999 | Varaprasad et al. |
| 5,949,331 A | 9/1999 | Schofield et al. |
| 5,978,017 A | 11/1999 | Tino |
| 6,002,544 A | 12/1999 | Yatsu |
| 6,013,372 A | 1/2000 | Hayakawa et al. |
| 6,071,606 A | 6/2000 | Yamazaki et al. |
| 6,072,814 A | 6/2000 | Ryan et al. |
| 6,097,023 A | 8/2000 | Schofield et al. |
| 6,117,193 A | 9/2000 | Glenn |
| 6,151,065 A | 11/2000 | Steed et al. |
| 6,154,306 A | 11/2000 | Varaprasad et al. |
| 6,176,602 B1 | 1/2001 | Pastrick et al. |
| 6,178,034 B1 | 1/2001 | Allemand et al. |
| 6,193,378 B1 | 2/2001 | Tonar et al. |
| 6,201,642 B1 | 3/2001 | Bos |
| 6,222,447 B1 | 4/2001 | Schofield et al. |
| 6,259,475 B1 | 7/2001 | Ramachandran et al. |
| 6,276,821 B1 | 8/2001 | Pastrick et al. |
| 6,292,311 B1 | 9/2001 | Bohn et al. |
| 6,302,545 B1 | 10/2001 | Schofield et al. |
| 6,320,176 B1 | 11/2001 | Schofield et al. |
| 6,353,392 B1 | 3/2002 | Schofield et al. |
| 6,396,397 B1 | 5/2002 | Bos et al. |
| 6,454,449 B2 | 9/2002 | Nestell et al. |
| 6,481,003 B1 | 11/2002 | Maeda |
| 6,483,101 B1 | 11/2002 | Webster |
| 6,498,620 B2 | 12/2002 | Schofield et al. |
| 6,523,964 B2 | 2/2003 | Schofield et al. |
| 6,535,242 B1 | 3/2003 | Strumolo et al. |
| 6,559,435 B2 | 5/2003 | Schofield et al. |
| 6,559,439 B1 | 5/2003 | Tsuchida et al. |
| 6,590,658 B2 | 7/2003 | Case et al. |
| 6,603,612 B2 | 8/2003 | Nakano |
| 6,611,202 B2 | 8/2003 | Schofield et al. |
| 6,651,187 B2 | 11/2003 | Lacey, III |
| 6,654,187 B2 | 11/2003 | Ning |
| 6,690,268 B2 | 2/2004 | Schofield et al. |
| 6,717,610 B1 | 4/2004 | Bos et al. |
| 6,757,109 B2 | 6/2004 | Bos |
| 6,805,767 B2 | 10/2004 | Shunomiya et al. |
| 6,806,452 B2 | 10/2004 | Bos et al. |
| 6,822,563 B2 | 11/2004 | Bos et al. |
| 6,831,261 B2 | 12/2004 | Schofield et al. |
| 6,891,563 B2 | 5/2005 | Schofield et al. |
| 6,897,432 B2 | 5/2005 | Schmidtke et al. |
| 6,946,978 B2 | 9/2005 | Schofield |
| 6,977,619 B2 | 12/2005 | March et al. |
| 7,004,606 B2 | 2/2006 | Schofield |
| 7,005,974 B2 | 2/2006 | McMahon et al. |
| 7,015,944 B2 | 3/2006 | Holz et al. |
| 7,031,075 B2 | 4/2006 | Tsuji |
| 7,038,577 B2 | 5/2006 | Pawlicki et al. |
| 7,095,123 B2 | 8/2006 | Prior |
| 7,095,572 B2 | 8/2006 | Lee et al. |
| 7,123,168 B2 | 10/2006 | Schofield |
| 7,215,479 B1 | 5/2007 | Bakin |
| 7,255,451 B2 | 8/2007 | McCabe et al. |
| 7,268,957 B2 | 9/2007 | Frenzel et al. |
| 7,339,149 B1 | 3/2008 | Schofield et al. |
| 7,370,983 B2 | 5/2008 | DeWind et al. |
| 7,391,458 B2 | 6/2008 | Sakamoto |
| 7,419,315 B2 | 9/2008 | Hirata et al. |
| 7,423,665 B2 | 9/2008 | Ray et al. |
| 7,453,509 B2 | 11/2008 | Losehand et al. |
| 7,599,134 B2 | 10/2009 | Bechtel et al. |
| 7,768,574 B2 | 8/2010 | Humpston |
| 7,965,336 B2 | 6/2011 | Bingle et al. |
| 8,064,146 B2 | 11/2011 | Iwasaki |
| 8,120,652 B2 | 2/2012 | Bechtel et al. |
| 8,318,512 B2 | 11/2012 | Shah et al. |
| 8,542,451 B2 | 9/2013 | Lu et al. |
| 9,277,104 B2 | 3/2016 | Sesti et al. |
| 9,338,334 B2 | 5/2016 | Lu et al. |
| 9,451,138 B2 | 9/2016 | Winden et al. |
| 9,497,368 B1 | 11/2016 | Winden et al. |
| 9,635,230 B2 | 4/2017 | Winden et al. |
| 2002/0159270 A1 | 10/2002 | Lynam et al. |
| 2003/0090569 A1 | 5/2003 | Poechmueller |
| 2003/0137595 A1 | 7/2003 | Takachi |
| 2004/0016870 A1 | 1/2004 | Pawlicki et al. |
| 2004/0032321 A1 | 2/2004 | McMahon et al. |
| 2004/0051634 A1 | 3/2004 | Schofield et al. |
| 2005/0104995 A1 | 5/2005 | Spryshak et al. |
| 2005/0190283 A1 | 9/2005 | Ish-Shalom et al. |
| 2005/0232469 A1 | 10/2005 | Schofield et al. |
| 2005/0274883 A1 | 12/2005 | Nagano |
| 2006/0038668 A1 | 2/2006 | DeWard et al. |
| 2006/0049533 A1 | 3/2006 | Kamoshita |
| 2006/0050018 A1 | 3/2006 | Hutzel et al. |
| 2006/0054802 A1 | 3/2006 | Johnston |
| 2006/0056077 A1 | 3/2006 | Johnston |
| 2006/0061008 A1 | 3/2006 | Karner et al. |
| 2006/0065436 A1 | 3/2006 | Gally et al. |
| 2006/0077575 A1 | 4/2006 | Nakai et al. |
| 2006/0125919 A1 | 6/2006 | Camilleri et al. |
| 2006/0171704 A1 | 8/2006 | Bingle et al. |
| 2006/0184297 A1 | 8/2006 | Higgins-Luthman |
| 2007/0096020 A1 * | 5/2007 | Mitsugi ............ G02B 7/025 250/239 |
| 2007/0279518 A1 | 12/2007 | Apel et al. |

(56) References Cited

U.S. PATENT DOCUMENTS

| | | | |
|---|---|---|---|
| 2008/0024883 A1* | 1/2008 | Iwasaki | G02B 7/022 359/808 |
| 2008/0043105 A1 | 2/2008 | Kallhammer et al. | |
| 2009/0010494 A1 | 1/2009 | Bechtel et al. | |
| 2009/0244361 A1 | 10/2009 | Gebauer et al. | |
| 2010/0103308 A1* | 4/2010 | Butterfield | H01L 27/14685 348/340 |
| 2010/0279439 A1 | 11/2010 | Shah et al. | |
| 2011/0298968 A1 | 12/2011 | Tseng et al. | |
| 2014/0000804 A1* | 1/2014 | Looi | H01L 24/75 156/275.5 |
| 2014/0022657 A1 | 1/2014 | Lu et al. | |

FOREIGN PATENT DOCUMENTS

| | | |
|---|---|---|
| EP | 1271214 | 1/2003 |
| EP | 1351316 | 10/2003 |
| EP | 1605520 | 12/2005 |
| JP | 08-084277 | 3/1996 |
| JP | 2006-293100 | 10/2006 |
| JP | 2006-350372 | 12/2006 |
| WO | WO 2001/044850 | 6/2001 |
| WO | WO 2004/010679 | 1/2004 |
| WO | WO 2006/029995 | 3/2006 |
| WO | WO 2006/029996 | 3/2006 |
| WO | WO 2007/053404 | 5/2007 |
| WO | WO 2010/011465 | 9/2010 |

* cited by examiner

FIG. 9

METHOD OF ASSEMBLING CAMERA FOR VEHICLE VISION SYSTEM

CROSS REFERENCE TO RELATED APPLICATIONS

The present application is a continuation of U.S. patent application Ser. No. 15/349,012, filed Nov. 11, 2016, now U.S. Pat. No. 9,635,230, which is a continuation of U.S. patent application Ser. No. 15/268,940, filed Sep. 19, 2016, now U.S. Pat. No. 9,497,368, which is a continuation of U.S. patent application Ser. No. 14/535,739, filed Nov. 7, 2014, now U.S. Pat. No. 9,451,138, which claims the filing benefits of U.S. provisional application Ser. No. 61/905,462, filed Nov. 18, 2013 and Ser. No. 61/901,127, filed Nov. 7, 2013, which are hereby incorporated herein by reference in their entireties.

FIELD OF THE INVENTION

The present invention relates generally to vehicle vision systems and, more particularly, to vehicular cameras for vehicle vision systems.

BACKGROUND OF THE INVENTION

Vehicular cameras are used for a variety of purposes, such as to assist a driver in avoiding obstacles behind a vehicle when backing up, and to detect imminent collisions ahead of the vehicle when driving forward. A vehicular camera includes a lens that focuses video input on an image sensor provided on an imager. In general, the position of the lens relative to the image sensor can impact the quality of the video input received by the image sensor. For example, if the lens is positioned such that the video input is not in focus, then the video information passed to the driver may be blurry, and other vehicular systems, such as a collision detection system for example, may not function as well as they otherwise could. As the size of the camera is reduced, the positioning of the lens relative to the image sensor may be relatively more critical, at least because small variations in position can result in relatively large changes in angular offset. Therefore, the positioning of the lens relative to the image sensor may be particularly critical for vehicular rearview cameras. Furthermore, it is important that the camera be capable of holding the lens in position over a selected period of time under certain operating conditions, so that the performance of the camera is maintained over a useful operating life.

Several aspects of the camera may contribute to the overall tolerance in the position of the lens relative to the image sensor. For example, for lenses and lens holders that are threaded, the threaded connection therebetween has a tolerance associated with it. The angle of cast of the lens holder has a tolerance associated with it. The position of the imager has a tolerance associated with it.

It is desirable to provide a more integrated, lower cost camera assembly with means for positioning the lens relative to the imager within tolerance.

SUMMARY OF THE INVENTION

The present invention provides a vehicular camera assembly having a lens and imager, and with the lens focused at the imager and adhered relative to the imager using an adhesive that provides enhanced bond strength and stability, and that is resistant to environmental aging. The adhesive is initially curable in an initial curing process that comprises exposure to UV light, and the initially-cured adhesive is further curable to a further cured strength in a secondary curing process.

The adhesive comprises a UV curable and heat curable one-part filled adhesive having a viscosity at 23 degrees C. from about 5,000 mPa to about 150,000 mPa and comprising an epoxy resin. The preferred adhesive is adhesive OB749 or AD VE 112203 or OB787, manufactured by Delo Industrial Adhesives of Sudbury, Mass. and Windach, Germany. Such adhesives are UV-/light-/heat curing adhesives having medium viscosity.

These and other objects, advantages, purposes and features of the present invention will become apparent upon review of the following specification in conjunction with the drawings.

BRIEF DESCRIPTION OF THE DRAWINGS

FIG. 7A is a sectional view of the camera assembly taken along the line A-A in FIG. 7;

FIG. 9 shows test results of an exemplary production adhesive; and

DETAILED DESCRIPTION OF THE INVENTION

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
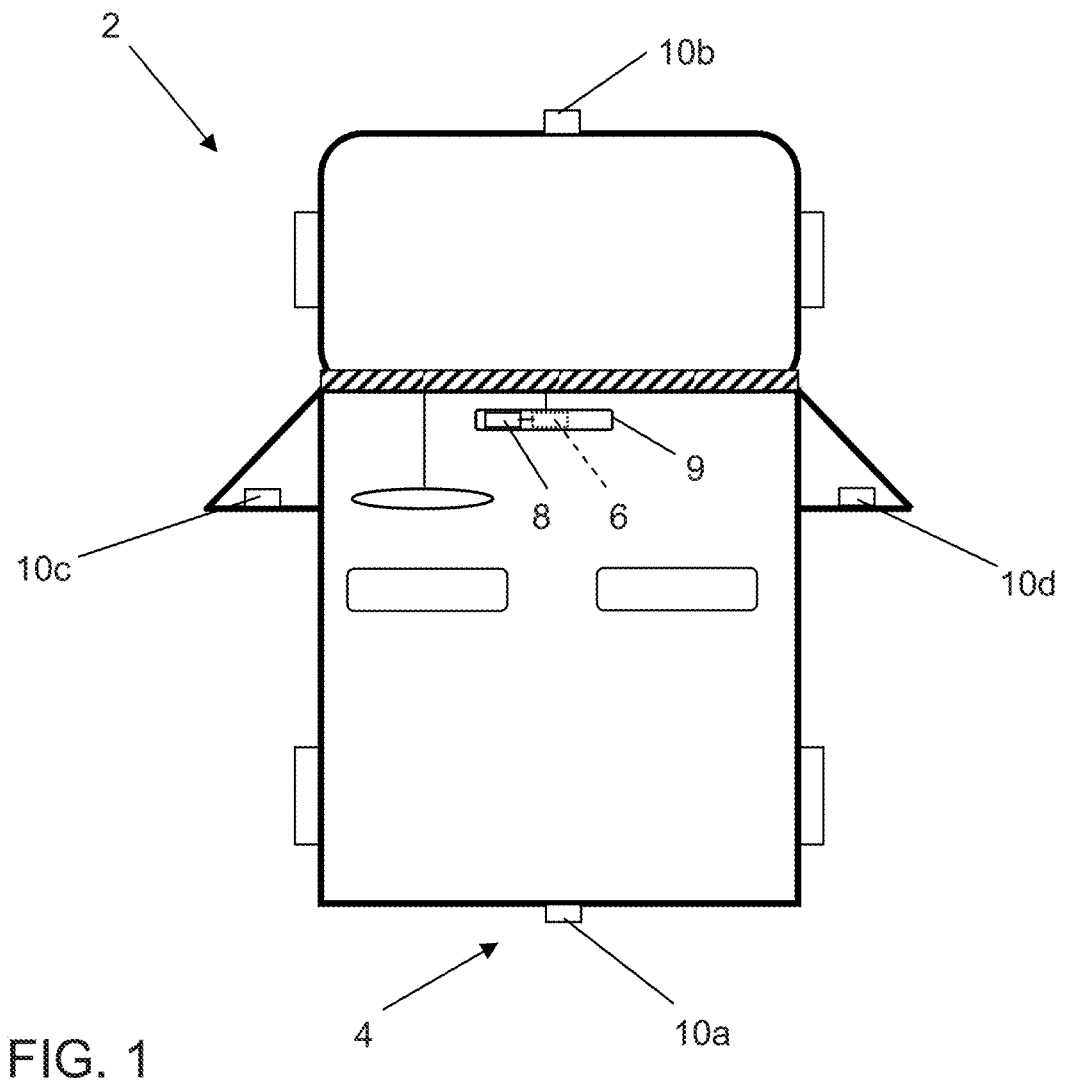
FIG. 1 is a plan view of a vehicle with a vision system that incorporates cameras in accordance with the present invention.

Referring now to the drawings and the illustrative embodiments depicted therein, a vehicle 2 includes an imaging system or vision system 4 that includes at least one exterior facing imaging sensor or camera 10, such as a rearward facing imaging sensor or camera 10a (and the system may optionally include multiple exterior facing imaging sensors or cameras, such as a forwardly facing camera 10b at the front (or at the windshield) of the vehicle, and a sidewardly/rearwardly facing camera 10c, 10d at respective sides of the vehicle), which captures images exterior of the vehicle, with the camera having a lens for focusing images at or onto an imaging array or imaging plane or imager of the camera (FIG. 1). The vision system 4 includes a control or electronic control unit (ECU) or processor 6 that is operable to process image data captured by the cameras and may provide displayed images at a display device 8 for viewing by the driver of the vehicle (although shown in FIG. 1 as being part of or incorporated in or at an interior rearview mirror assembly 9 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 2:
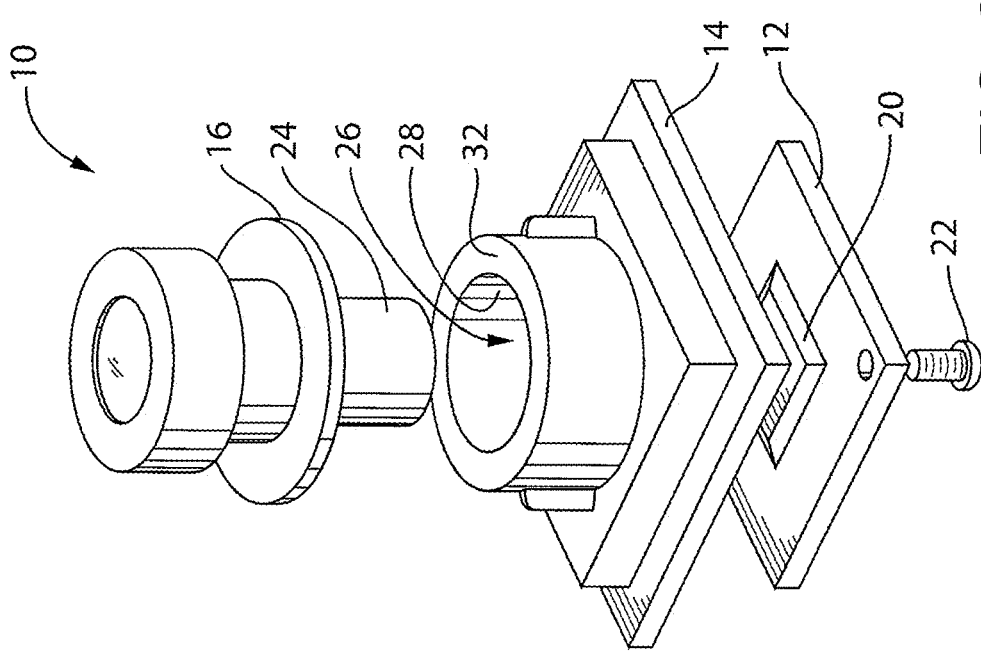
FIG. 2 is an exploded perspective view of a vehicular camera in accordance with an first embodiment of the invention wherein a lens barrel is adhesively secured to a lens holder via a UV-curable adhesive.

FIG. 2 shows an exploded view of an exemplary vehicular camera construction 10, which may be assembled in accordance with the present invention. The vehicular camera 10 includes an imager 20, a lens holder such as a front camera housing 14 and a lens 16. The vehicular camera 10 may include other components such as additional circuitry for processing the video input received by the imager 20, such as, for example, circuitry for providing graphic overlay to the video input or the like. The vehicular camera 10 may further be configured to transmit the video input to other vehicular devices, such as a display controller (not shown) for a cabin-mounted display (not shown).

Figure 3:
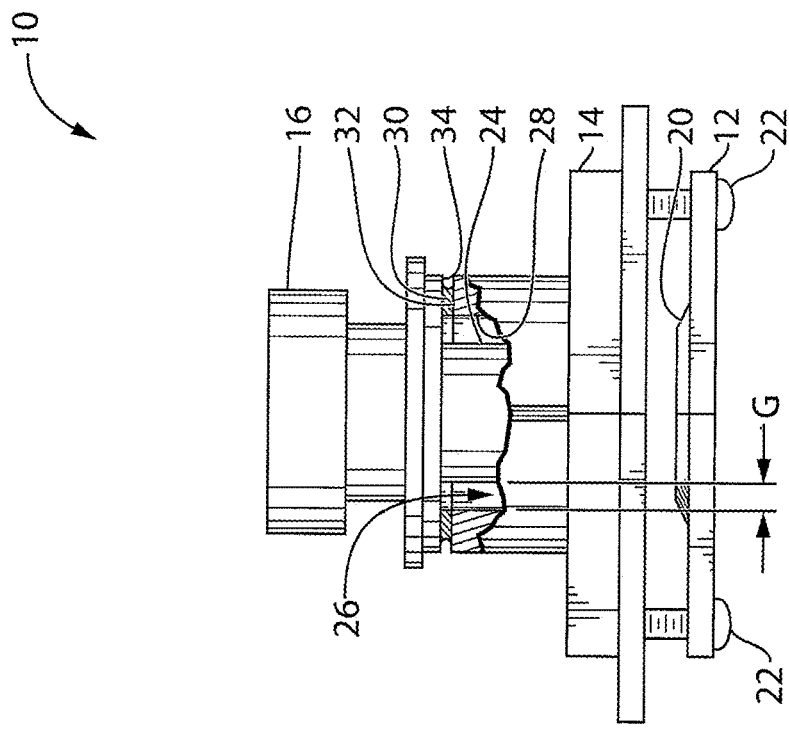
FIG. 3 is a cutaway side view of the vehicular camera shown in FIG. 2, in an assembled state.

The imager 20 may be a charge-coupled device (CCD) or a complimentary metal-oxide semiconductor (CMOS) sensor. Referring additionally to FIG. 3, the imager 20 is mounted to a printed circuit board (PCB) 12. The imager 20 is positioned to receive optical images from the lens 16. Optionally, and such as shown in FIGS. 2 and 3, the imager 20 may be connected to the lens holder 14 by a plurality of threaded fasteners 22.

The lens 16 is mounted to the lens holder/front camera housing 14 at a selected position for focusing images onto the sensing surface of the imager 20. The lens 16 may comprise any suitable type of lens known in the art and may comprise multiple glass or plastic lens optics or elements disposed in and along a lens barrel. In the illustrated embodiment, the lens 16 has an exterior surface 24 that is configured to be received in a cylindrical aperture 26 having an aperture wall 28 on the lens holder/front camera housing 14. The exterior surface 24 and the aperture wall 28 may have a selected amount of clearance therebetween, shown by a gap G. An adhesive 30 is provided for holding the lens 12 in a specific position relative to the lens holder/front camera housing 14. More particularly, the adhesive 30 may be applied between a first axial face 32 on the lens holder/front camera housing 14, and a second axial face 34 on the lens 16.

The position of the lens 16 relative to the imager 20 impacts the degree of focus present in the optical images received by the imager 20 and thus the performance of the camera 10 and the optical alignment of the optical image on the imager.

To control the position of the lens 16, a positioning system may be provided that includes a robot. The robot holds and adjusts the position of the lens 16 relative to the lens holder/front camera housing 14 until a target object appears in suitable focus and at a suitable position on the imager 20, prior to the curing or hardening of the adhesive 30. The adjustment of the lens 16 relative to the lens holder/front camera housing 14 is facilitated by providing the selected amount of clearance between the exterior surface 24 of the lens 16 and the aperture wall 28 of the lens holder/front camera housing 14. Additionally, the thickness of the layer of adhesive 30 between the lens 16 and lens holder/front camera housing 14 may be selected to provide a suitable amount of relative angular adjustment between the lens 16 and lens holder 14/front camera housing. The thickness of the layer of adhesive may be approximately 0.75 mm prior to adjustment of the lens 16.

Once the lens 16 has been suitably positioned by the robot, the adhesive 30 is initially cured by exposure to UV light while the robot holds the lens 16 in position. The UV light may be provided from a plurality of UV sources about the periphery of the camera 10. The initial curing of the adhesive 30 may result in the adhesive being strong enough to hold the lens 16 in the lens holder/front camera housing 14 without needing the robot to grip the lens 16, and may take less than about 10 seconds, such as less than about 7 seconds. However, the lens 16 may be susceptible to movement if it incurs a relatively small disturbance at this stage. After the initial curing, the camera 10 may be placed by the robot relatively gently on a conveyor and moved to a further curing station, such as a further UV curing station for a further UV curing period, such as, for example, about 25 seconds. Another curing station, such as another UV curing station may optionally be provided to further cure the adhesive 30 for another period, such as about 25 seconds, after the camera 10 leaves the first UV curing station. Subsequent to the UV curing, the camera 10 may be transferred to another curing station where the adhesive 30 can be thermally cured, or may be cured by exposure to some other secondary curing condition, to achieve its fully cured strength so that it can hold the lens 16 in position during use on a vehicle. The step of initially curing the adhesive 30 using UV light may be relatively instantaneous. The step of thermally curing the adhesive may take several minutes or hours. As an additional or alternative curing measure, the adhesive 30 may be moisture cured.

Providing an adhesive 30 that has an initial curability by UV light is advantageous in that the robot is not needed to hold the lens 16 in position over the period of time that it would take for the secondary curing condition to sufficiently harden the adhesive 30 to be self-supporting. Once the camera 10 is transferred from the robot to the curing fixture, the robot can be used for the positioning of another lens 16 in another lens holder 14/front camera housing. Because the task of positioning the lens 16 and initially curing the adhesive 30 using UV light can take less time than fully thermally curing of the adhesive 30, a single robot can feed cameras 10 with initially cured lenses to a plurality of curing fixtures, thereby providing the capability of achieving a relatively high rate of production per robot.

Once fully cured, the adhesive 30 may be capable of holding the lens 16 in position with at least a selected strength of bond between the lens 16 and lens holder/front camera housing 14 under one or more selected operating conditions. For example, the adhesive 30 may be capable of holding the lens 16 in position after a selected time period of 1000 hours of exposure to a selected temperature of about 85 degrees Celsius and optionally a humidity of approximately 85%. Any of the aforementioned selected values may be selected to suit the particular environment that the camera 10 is expected to experience during use. The selected time period may, for example, be some other time period, such as approximately 1200 hours. The selected adhesive 30 may be further capable of holding the lens 16 in position after a selected time period exposed to a selected temperature of about −40 degrees Celsius.

The adhesive 30 may be applied by the robot itself prior to adjustment of the lens 16 relative to the lens holder/front camera housing 14 (where the lens is brought into focus with the imager and is optically center-aligned therewith). Alternatively, the adhesive 30 may be applied by some other device prior to (or during) possession of the camera 10 by the robot.

Optionally, and aside from fixing the position of the lens 16 relative to the lens holder/front camera housing 14, the adhesive 30 may also hermetically seal the interior of the camera 10 against the outside environment.

Numerous adhesives were attempted for use as the adhesive 30. For example, it was found that some adhesives, such as some UV-cure free radical acrylates that have the capability of being initially cured using UV light, have a reduced strength (such as a reduced tensile strength) under exposure to elevated operating temperatures such as about 85 degrees Celsius over a selected period of time. It was further found that adhesives, such as some UV-curable free radical epoxy hybrids also have a reduced strength (such as a reduced tensile strength) under exposure to elevated operating temperatures such as about 85 degrees Celsius over a selected period of time. Some anionic cyanoacrylates that were tried were unsuitable as they produced too much outgas for optical use. Other adhesives, such as some UV-cure free radical silicones or the like, have a relatively low dimensional stability and are thus not suitable.

It has been found that a suitable adhesive that can be used for the adhesive is adhesive AD VE 43812 manufactured by Delo Industrial Adhesives of Windach, Germany. This adhesive is a low-temperature cure, epoxy-amine adhesive that can be cured initially relatively quickly by exposure UV light. Aspects of this adhesive are suitable for use in a vehicular camera, such as described in U.S. Pat. No. 8,542,451 and/or International Publication No. WO 2013/063014, which are hereby incorporated herein by reference in their entireties.

Automotive cameras are assembled by way of a precise spatial positioning of the image sensor relative to the lens. This may be achieved in two ways. For a camera of the type shown in FIG. 4, the lens assembly is held in a fixed position while the imager printed circuit board or PCB (with image sensor) is positioned relative to the lens assembly (such as via a robot that moves the PCB relative to the lens assembly, which is held or fixed at a fixture). For a camera of the type shown in FIG. 5, the imager PCB is held in a fixed position (such as via a fixture) while the lens is positioned (such as via a robot) relative to the fixtured PCB (such as by utilizing aspects of the systems described in International Publication No. WO 2013/063014, which is hereby incorporated herein by reference in its entirety). The camera may have the lens threadedly attached at the lens holder and threadedly adjustable to adjust the focus of the images at the imager. Optionally, the lens barrel may threadedly attach at the lens holder, or the lens barrel may adhesively attach at the lens holder, or the lens barrel may threadedly and adhesively attach at the lens holder. Optionally, the lens barrel may be unitarily formed with or integrated into the lens holder such that they comprise a single or unitary element or piece of unitary construction.

For either type of cameras, a compliant connecting member or element must exist between the two components that allows for the relative movement or adjustment of the lens relative to the imager (to bring the lens into focus with the imager and to optically center-align the lens with the imager). This connecting member or bonding material or element must also have a means of being permanently fixed once the desired position is found. A UV curable adhesive, such as described in U.S. Pat. No. 8,542,451 and/or International Publication No. WO 2013/063014, which are hereby incorporated herein by reference in their entireties, may be used for this member.

Figure 6:
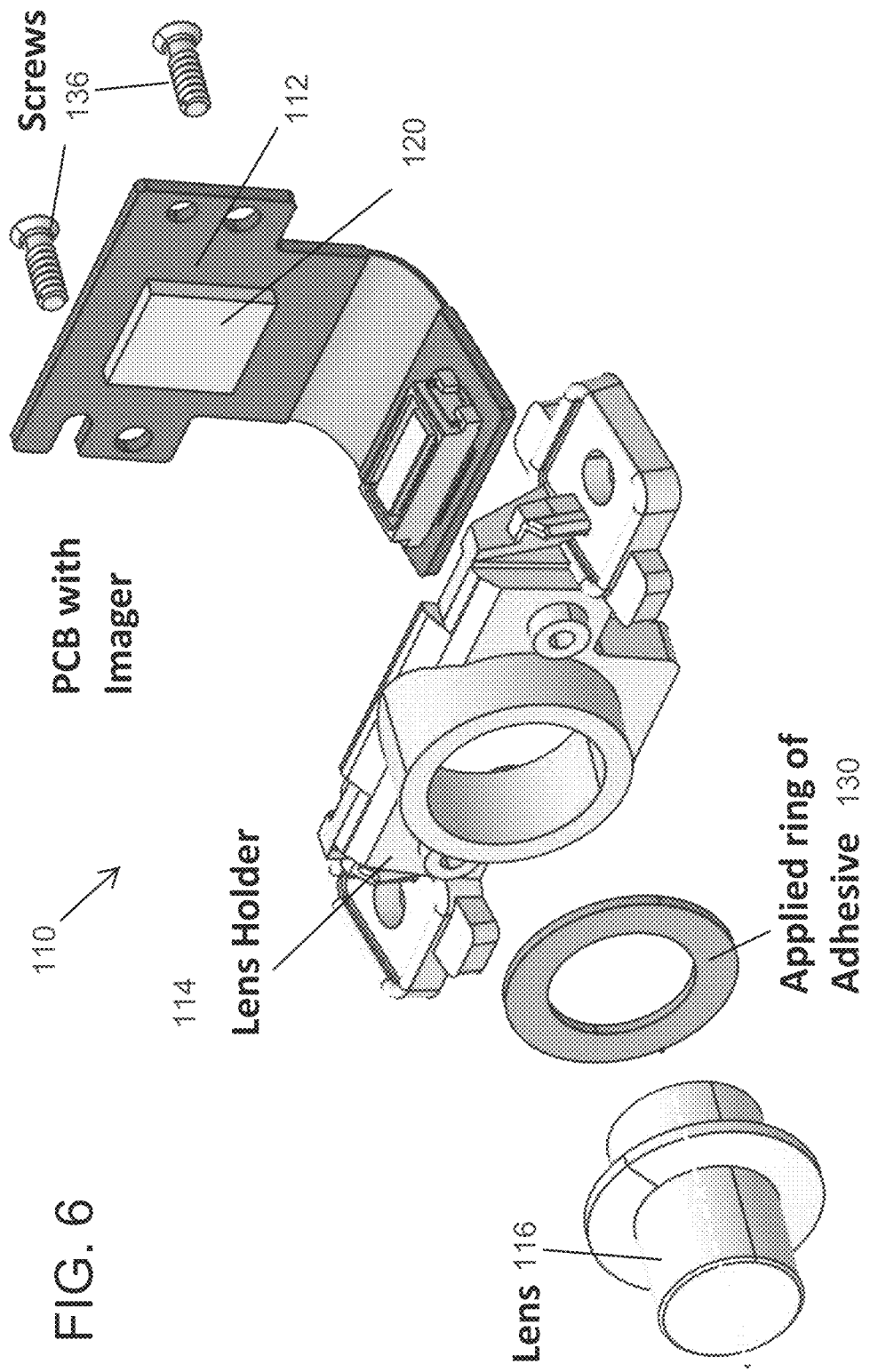
FIG. 6 is an exploded view of a camera assembly that is assembled with an adhesive in accordance with the present invention.
Figure 7:
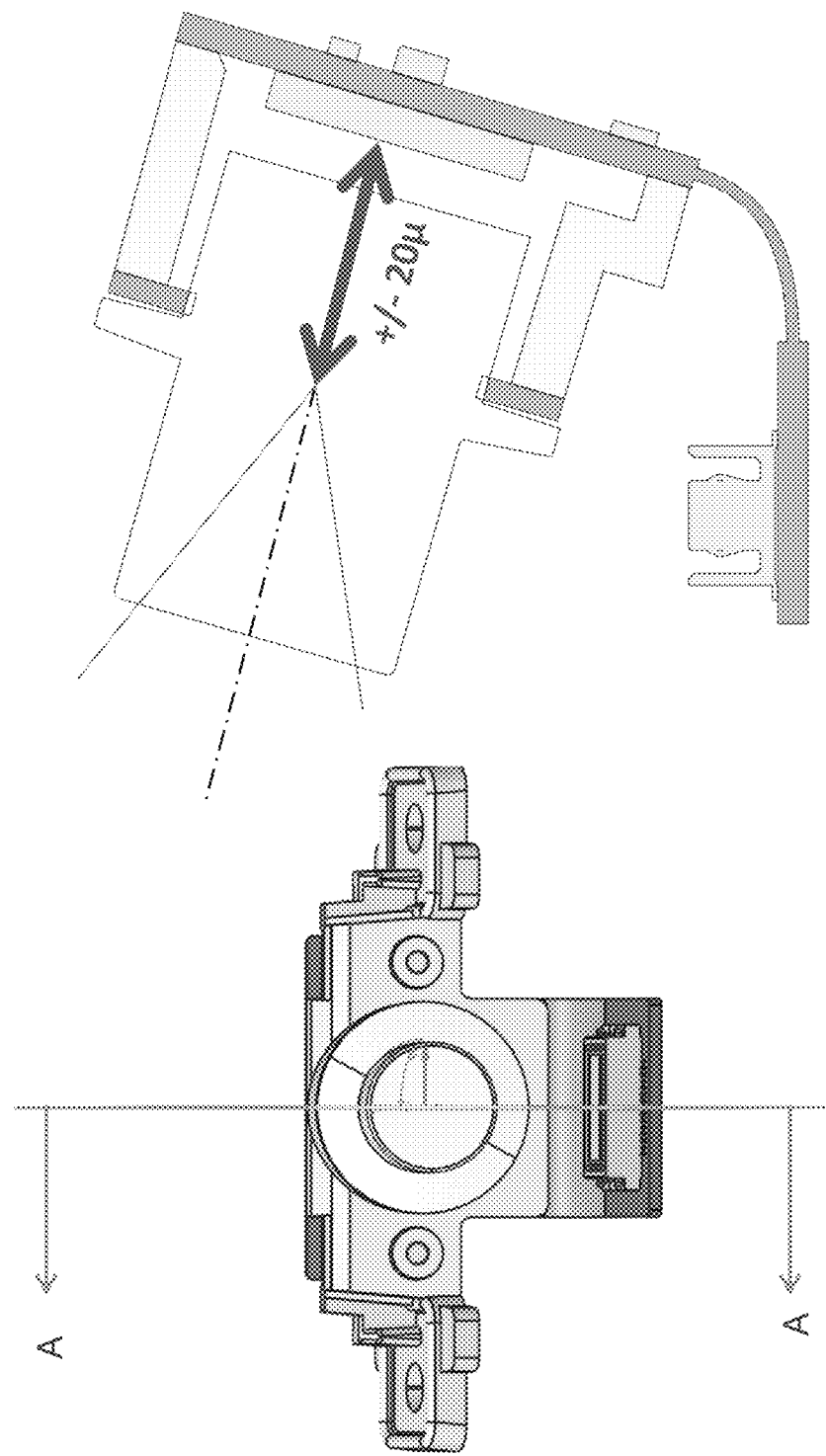
FIG. 7 is an end view of the camera assembly of FIG. 6.

FIGS. 6, 7 and 7A show views of another exemplary vehicular camera construction 110, which may be assembled in accordance with the present invention. The vehicular camera 110 includes an imager 120 disposed at a printed circuit board or PCB 112, a lens holder 114 and a lens 116. The vehicular camera 110 may include other components such as additional circuitry for processing the video input received by the imager 120, such as, for example, circuitry for providing graphic overlay to the video input or the like. The vehicular camera 110 may further be configured to transmit the video input to other vehicular devices, such as a display controller (not shown) for a cabin-mounted display (not shown). As shown in FIG. 6, the adhesive 130 may be disposed between the lens 116 and the lens holder 114, which is attached at the printed circuit board 112 via a plurality of fasteners or screws 136.

The front camera module (FCM) of the present invention is designed with the intent to maintain highest focus possible throughout the life and usage of the camera. The focus is found during the assembly process (such as during an assembly process of the type described in U.S. Pat. No. 8,542,451 and/or International Publication No. WO 2013/063014, which are hereby incorporated herein by reference in their entireties), and is maintained over the life of the part. This effective focal length (EFL) may have a minimum tolerance of about +/−0.02 mm (+/−20μ).

In order to be suitable for use on a vehicle over the lifetime of the vehicle, the FCM must meet the ECE-R48 government regulation for automatic high-beam control (AHBA) functions. AHBA must be capable to detect an oncoming vehicle, and shutdown the high-beam/revert back to low-beam while the oncoming vehicle is greater than 400 m distance from the subject or equipped or host vehicle. The required distance has been correlated to a focus score threshold for the Camera. This focus threshold is determined by testing done by both the FCM manufacturer and the vehicle manufacturer and is 40 line pairs/mm (MTF). This focus threshold must be maintained for the life of the camera, from end-of-line build confirmation focus score to up to ten years of service in the field.

Figure 8:
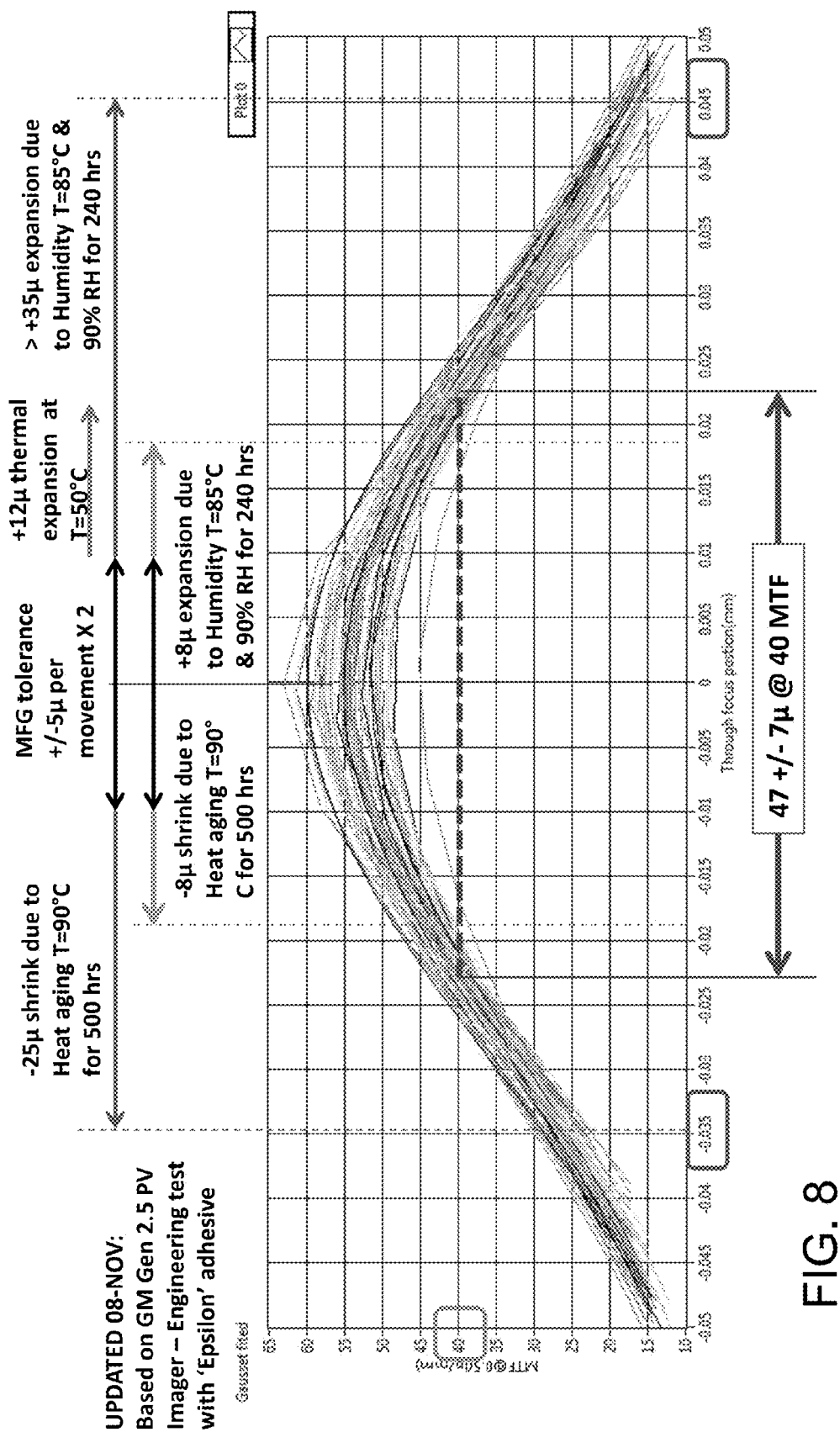
FIG. 8 is a graph showing the movement of the lens relative to the imager after testing for various camera assemblies.

The focus requirement is shown in FIG. 8. The graph of FIG. 8 shows typical through-focus curves for the lenses used on the forward facing camera module (FCM). The challenge is to build at a specification that provides an optimized optical zone, such as to build at about 40 MTF, and to maintain that focus over time. Note that typical capability to achieve this performance resides in a narrow distance of, for example, about 47μ. Thus, the FCM imager assembly, once built, cannot move more than, for example, about 0.040 mm or so, over its lifetime of use on a vehicle.

This includes its life and use during heat exposure, during thermal expansion during normal operation, during exposure to humidity and/or the like, and includes manufacturing tolerances and variations.

Figure 9:
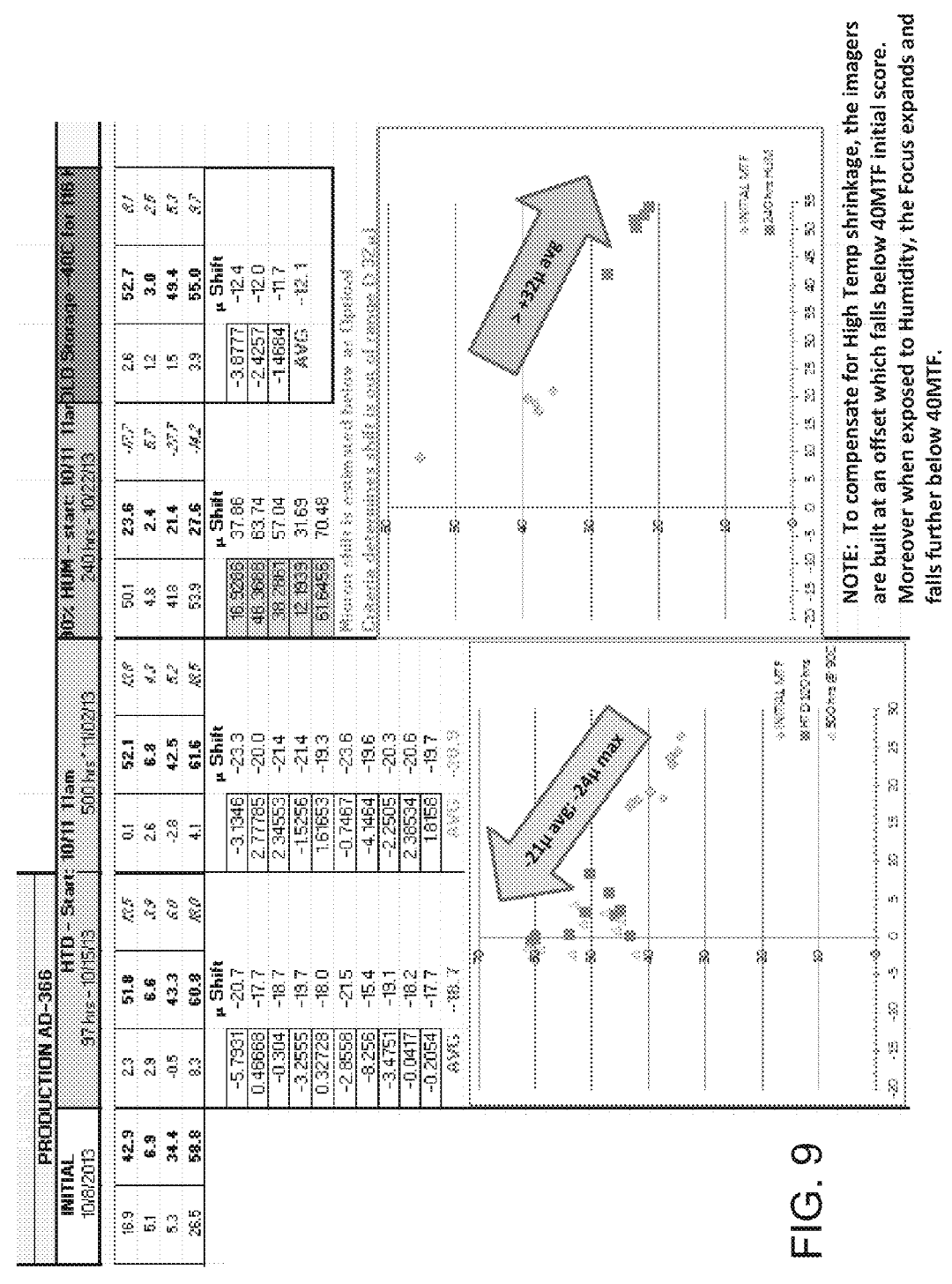
Figure 10:
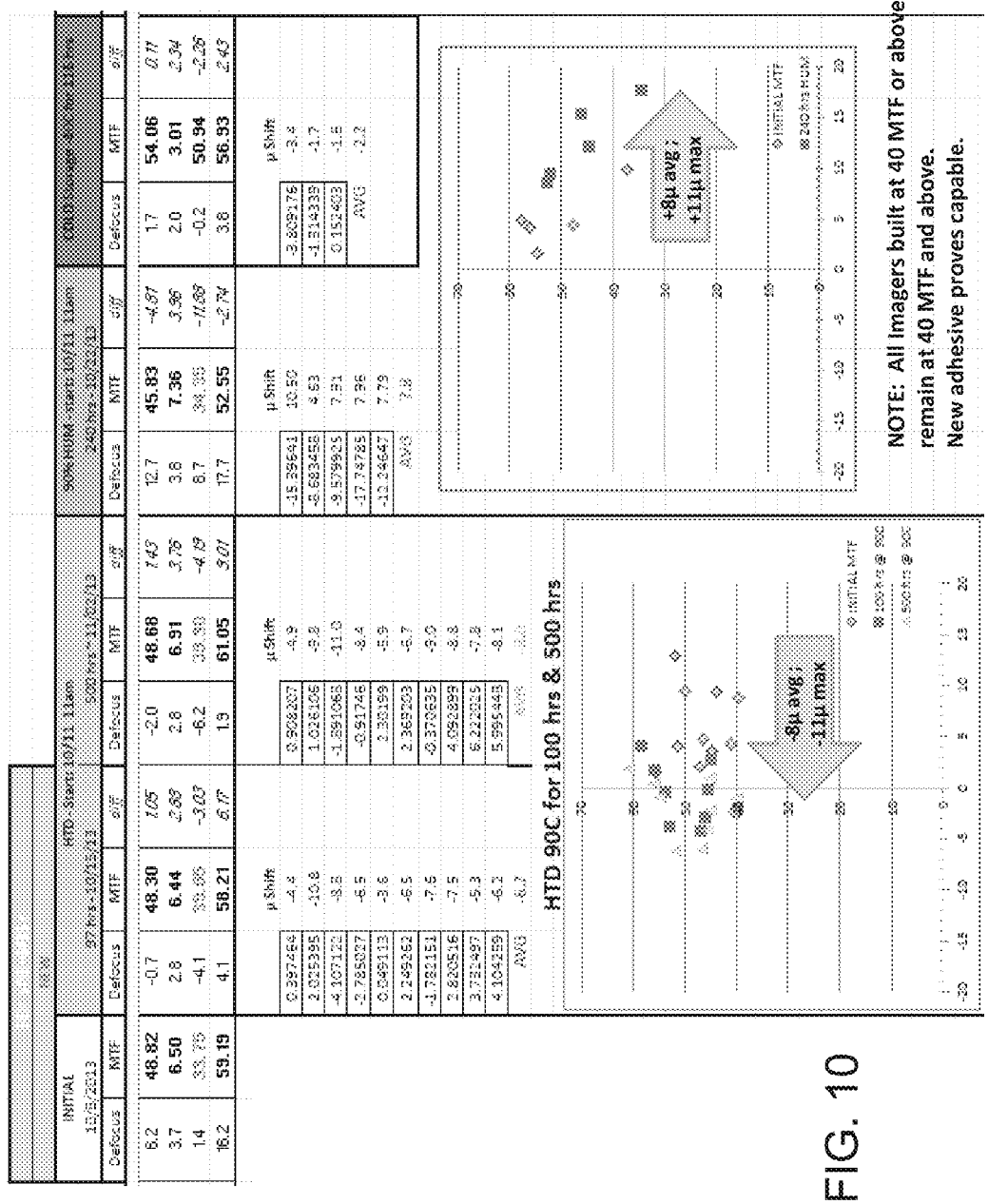
FIG. 10 shows test results of the preferred adhesive for the camera assembly of the present invention.

FIG. 8 shows test results for the adhesive of the present invention as compared to other exemplary proposed production intent adhesives. Based on validation to environments requirements (such as maintaining focus greater than 40 MTF after exposure to (i) high temperature degradation (400 hours at 90 degrees C.) and (ii) humidity (240 hours at 85 degrees C. and 90% relative humidity)), the graph shows that the other exemplary adhesive has a total movement of approximately −35μ to +45μ, which results in about +80μ total movement, which is much greater than the minimum lens capability (such as, for example, about +40μ). As shown in FIG. 8, the adhesive of the present invention has a total movement of approximately −18μ to +18μ, which results in about +36μ total movement, which is less than the minimum lens capability, and thus meets the desired performance. FIGS. 9 and 10 show further test results of an exemplary production adhesive (FIG. 9) and the adhesive as applied in accordance with the present invention (FIG. 10).

Thus, the present invention provides an improved adhesive that provides enhanced performance and strength of the bond that holds the lens relative to the imager. The adhesive was selected based on many of its properties—dimensional stability, resistance to environmental conditioning, quick cure time, bond strength, dual cure nature, and the like. Requirements for improved focus for high resolution mega pixel cameras and forward facing machine vision systems have led to requests for such an enhanced adhesive. It has been found that a higher bond strength is desired to better support global manufacturing processes in which cure parameters (which effect adhesive properties and bond strength) may vary. In summary, improved dimensional stability and bond strength have been seen as desirable characteristics of the selected adhesive.

In general and as previously stated, the present invention provides an adhesive for a vehicular camera that has a high bond strength and excellent dimensional stability, and that is resistant to environmental aging and is UV curable with secondary cure mechanism. The below list is a summary of expectations:

- −40 degrees C. to 105 degrees C. operating range while maintaining greater than about 70 percent strength
- Tensile strength greater than 700 PSI
- Greater than about 50 Shore D hardness
- 30 k to 70 k cp viscosity
- UV Curable fixture in less than about 7 seconds
- Fully Curable in about 30 seconds or more
- Secondary two-part, moisture or thermal
- Non-hygroscopic (no significant moisture swell)
- Cure depth greater than about 3 mm
- Bond to PBT/PC and PBT plastics, FR4 PCB's, zinc and aluminum.
- Bond Shear Strength greater than about 1000 PSI with less than about 60 percent reduction at about 85 degrees C.
- Very little to no out gassing
- Withstand 1210 hours at about 85 degrees C./85% humidity
- Automotive grade
- Glass Transition Temperature greater than about 90 degrees C.

The below lists shows how the adhesive of the present invention has improved properties in comparison to the currently used product

- Higher Tg (95 degrees C. vs. 86 degrees C.)
- Less Thermal expansion (44-113 vs. 152-190)
- Less shrinkage (2.2% vs. 3.25%)
- Less water absorption (0.1% vs. 0.3%)
- Tensile strength greater than 5 times other adhesive (41 MPa vs. 7 MPa)

Improvements Achieved and How this Impacts Product Performance

The adhesive of the present invention outperforms current adhesives in many ways or every way that is of importance to the performance and durability of the vehicular camera:

- Bond strength is nearly twice as strong as what is seen in previous adhesives.
  - Limits or avoids risk of bond break failures and makes the process much less sensitive to cure parameter precision.
- Cure time is much faster which reduces cycle time.
  - Limits or avoids risk of bond failures and makes the process more robust by making it much less sensitive precise cure parameter.
- Shrink after cure is nearly non-existent.
  - The previous adhesive continues to shrink some after the product is built since the adhesive is not considered to be fully cured until 48 hours after UV and thermal cure. The processes must offset the focus position in anticipation of such shrinkage.
- Dimensional change from moisture absorption is nearly non-existent.

Testing of the adhesive of the present invention has shown that the bonded components bonded together using the adhesive of the present invention have retention forces of twice (or more) that of other tested adhesives, such as in tests where the bonded components are first stored at room temperature for approximately 30 days, or where the bonded components are thermally shocked via 10 days of cycling the parts between −40 degrees C. and 100 degrees C., or where the bonded components are first thermally shocked for ten days and then soaked for ten days at 85 degrees C. at 85% relative humidity.

The adhesive comprises a UV curable adhesive that preferably is a one-part, solvent free, filled adhesive comprising a modified epoxy resin. Such adhesives, as well as being UV curable, can also be cured thermally, such as by heat. For example, the adhesive preferably comprises an 06749 adhesive or AD VE 112203 or 06787 adhesive, both manufactured by Delo Industrial Adhesives of Sudbury, Mass. and Windach, Germany. Such adhesives are UV-/light-/heat curing adhesives having medium viscosity. Preferably, such UV light/heat curing adhesives have a viscosity in the range from about 5,000 mPa to about 150,000 mPa, preferably from about 10,000 mPa to 130,000 mPa, more preferably from about 12,000 mPa to about 120,000 mPa. Thus, the adhesive of the camera of the present invention comprises a UV curable and heat curable one-part filled adhesive having a viscosity at 23 degrees C. from about 5,000 mPa to about 150,000 mPa and comprising an epoxy resin. The AD VE 112203 or OB787 adhesive is substantially similar to the OB749 adhesive, but has a filler added to provide a preferred viscosity of the uncured adhesive. For example, the OB749 adhesive has a viscosity (at 23 degrees C.) of about 14,000 mPa, while the AD VE 112203 or OB787 adhesive has a viscosity (at 23 degrees C.) of about 115,000 mPa.

DELO®•DUALBOND® AD VE 112203 (a trade mark of and available from DELO Industrial Adhesives LLC of Sudbury, Mass.) or OB787 (the commercial product of the AD VE 112203 engineering development adhesive) comprises a UV-/light-/heat curing adhesive, medium viscosity, base modified epoxy resin, one-part, solvent free, filled, UV-/light-/heat curing adhesive formulated especially for fast fixing of components with high strength after irradiation and suitable for the bonding of metal, glass, plastic and other materials as well as for the coating, fixing or sealing of electronic components. It is normally used in a temperature range of −40 degrees C. to +150 degrees C., depending on the application. This adhesive is compliant with RoHS directive 2011/65/EU and is halogen-free according to IEC 61249-2-21. Curing of this adhesive is achieved with UV light or visible light, preferably in a wavelength range of about 320 nm to about 440 nm, or with heat. The light-curing mechanism and the heat-curing mechanism can be used independently. The color (cured in a layer thickness of approximate 0.1 mm) is white. The viscosity [mPa] at 23 degrees C., Brookfield rpm 7/5 is 115,000. The composition of DELO®•DUALBOND® AD VE 112203 or OB787 comprises vitreous Silica [CAS No. 60676-86-0 and %25-75], reaction product bisphenol-A-(epichlorhydrin); epoxy resin [CAS No. 25068-38-6 and %10-25], and Quartz ($SiO_2$) [CAS No. 14808-60-7 and %<2.5], and includes 7-oxabicyclo [4.1.0] hept-3-ylmethyl 7-oxabicyclo [4.1.0] heptane-3-carboxylate reaction product; bisphenol-A-(epichlorhydrin); epoxy resin.

Figure 4:
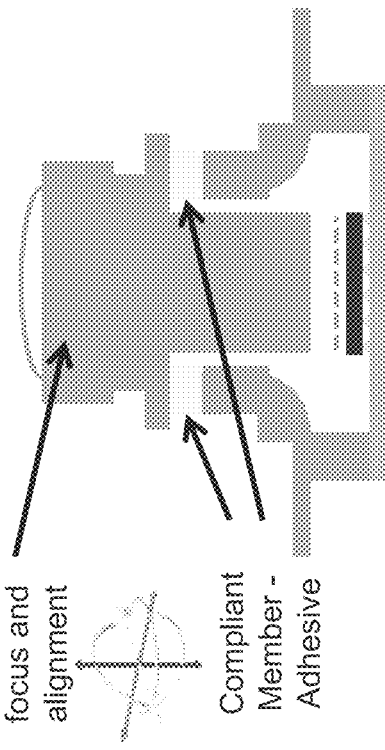
FIG. 4 is a camera of the present invention, which is assembled by the lens assembly being held in a fixed position while the imager printed circuit board or PCB (with the image sensor) is positioned relative to the lens assembly.
Figure 5:
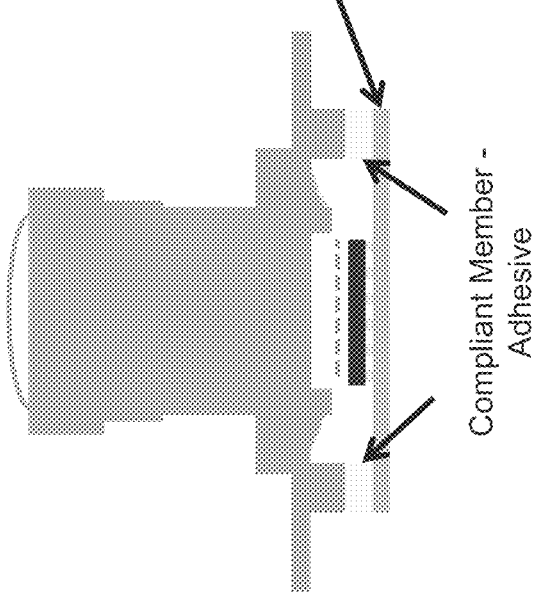
FIG. 5 is a camera of the present invention, which is assembled by the imager PCB being held in a fixed position while the lens is positioned relative to the PCB.

Therefore, the present invention provides a camera assembly that utilizes such an adhesive to bond the lens relative to the imager or PCB. The vehicular camera comprises (i) a lens having a plurality of optical elements and disposed at a lens holder, (ii) a printed circuit board and (iii) an imager disposed at said printed circuit board. The printed circuit board may be held by a holding element and the lens holder may be attached at the holding element by a cured adhesive (such as shown in FIG. 5), or the lens holder may be attached at the printed circuit board by a cured adhesive (such as shown in FIG. 4). The adhesive is initially curable in an initial radiation curing process that comprises exposure to UV light, and the initially-cured adhesive is further curable to a further cured strength in a secondary thermal curing process. The adhesive is initially cured via the initial radiation curing process after the lens is brought into focus with the imager and is optically center-aligned therewith. The initially-cured adhesive, as cured via the initial radiation curing process, holds the lens optically center-aligned and in focus with the imager. After the initial radiation curing process, the lens holder, adhesively attached to one of the printed circuit board and the holding element, is moved to the secondary thermal curing process. When further cured via the secondary thermal curing process, the further-cured adhesive maintains focus and optical center-alignment of the lens with the imager for use of the camera in a vehicle.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method of assembling a vehicular camera suitable for vehicular use, said method comprising:
   providing a lens comprising a plurality of optical elements, wherein said lens is accommodated in a lens barrel, and wherein said lens barrel comprises a cylindrical portion and an annular flange that circumscribes and extends radially from said cylindrical portion, and wherein said annular flange comprises a first mating surface;
   providing a camera front housing having a front portion and a rear portion, wherein said front portion comprises a cylindrical portion having a second mating surface;
   providing a printed circuit board, wherein an imager is disposed at said printed circuit board;
   providing an adhesive in its uncured state;
   dispensing the uncured adhesive so as to establish a layer of uncured adhesive between said first mating surface of said lens barrel and said second mating surface of said cylindrical portion of said front portion of said camera front housing;
   positioning said lens barrel at said front portion of said camera front housing by inserting said cylindrical portion of said lens barrel at least partially into a cylindrical passageway of said cylindrical portion of said front portion of said camera front housing until said first mating surface is at said second mating surface with said layer of uncured adhesive therebetween and contacting said first and second mating surfaces;
   bringing said lens into focus with said imager and optically center-aligning said lens with said imager;
   with said lens in focus with said imager and optically center-aligned therewith, initially curing the adhesive to an initially-cured state in an initial radiation curing process that comprises exposure to UV light for a first period of time;
   wherein the initially-cured adhesive, as cured via the initial radiation curing process, holds said lens in focus with said imager and optically center-aligned therewith;
   after the initial radiation curing process, further curing the initially-cured adhesive to a further-cured state in a secondary curing process;
   wherein said further-cured state is achieved within a second period of time;
   wherein said second period of time is longer than said first period of time;
   wherein, when further cured via the secondary curing process, the further-cured adhesive maintains focus and optical center-alignment of said lens with said imager for use of said camera in a vehicle;
   wherein the adhesive, in its uncured state, comprises a one-part, solvent-free, filled adhesive; and
   wherein the adhesive, in its uncured state, is halogen-free.

2. The method of claim 1, wherein the adhesive, in its uncured state, has viscosity at 23 degrees Celsius in the range from 5,000 mPa to 150,000 mPa.

3. The method of claim 1, wherein the adhesive, in its uncured state, has viscosity at 23 degrees Celsius in the range from 10,000 mPa to 130,000 mPa.

4. The method of claim 1, wherein the adhesive, in its uncured state, has viscosity at 23 degrees Celsius in the range from 12,000 mPa to 120,000 mPa.

5. The method of claim 1, wherein the adhesive, in its uncured state, has viscosity at 23 degrees Celsius of 115,000 mPa.

6. The method of claim 1, wherein said first period of time is less than 10 seconds.

7. The method of claim 1, wherein said first period of time is less than 7 seconds.

8. The method of claim 7, wherein said second period of time is 30 seconds.

9. The method of claim 1, wherein the step of dispensing the uncured adhesive comprises dispensing the uncured adhesive so as to establish a layer of uncured adhesive between said printed circuit board and said rear portion of said camera front housing, and wherein said method comprises (i) attaching said lens barrel at said front portion of said camera front housing and (ii) attaching said rear portion of said camera front housing to said printed circuit board with the adhesive between said printed circuit board and said rear portion of said camera front housing.

10. The method of claim 9, wherein the step of attaching said lens barrel at said front portion of said camera front housing comprises one of (i) threadedly attaching said lens barrel at said front portion of said camera front housing, (ii) adhesively attaching said lens barrel at said front portion of said camera front housing and (iii) threadedly and adhesively attaching said lens barrel at said front portion of said camera front housing.

11. The method of claim 1, wherein the adhesive, in its uncured state, comprises a one-part, solvent-free, filled epoxy adhesive.

12. The method of claim 1, comprising joining a camera rear housing to said camera front housing, wherein, when so joined, said camera rear housing and said camera front housing substantially encase said printed circuit board, and wherein said camera rear housing comprises an electrical connector that is configured for connecting to electrical wiring of the vehicle, and wherein said camera rear housing is joined to said camera front housing via at least one of (i) welding, (ii) an adhesive and (iii) press fitting.

13. The method of claim 1, wherein the step of dispensing the uncured adhesive comprises dispensing the uncured adhesive so as to establish a layer of uncured adhesive between said lens barrel and said front portion of said camera front housing, and wherein said method comprises (i) attaching said printed circuit board at said rear portion of said camera front housing and (ii) attaching said lens barrel to said front portion of said camera front housing with the adhesive between said lens barrel and said front portion of said camera front housing.

14. The method of claim 13, wherein the step of attaching said printed circuit board comprises attaching said printed circuit board at said rear portion of said camera front housing via screws.

15. The method of claim 1, wherein the step of bringing said lens into focus with said imager comprises bringing said lens into focus with said imager and optically center-aligning said lens with said imager robotically.

16. The method of claim 1, wherein the secondary curing process comprises a thermal curing process.

17. The method of claim 1, wherein the secondary curing process comprises a radiation curing process.

18. The method of claim 1, wherein the secondary curing process comprises a moisture curing process.

19. The method of claim 1, wherein said vehicular camera is configured for use as a rearward viewing camera of a vehicle.

20. The method of claim 1, wherein said vehicular camera is configured for use as a forward viewing camera for an automatic high-beam control system of a vehicle.

21. The method of claim 1, wherein the step of bringing said lens into focus with said imager comprises bringing said lens into focus with said imager so as to achieve an effective focal length with minimum tolerance of +/−0.02 mm.

22. The method of claim 1, wherein the adhesive bonds to at least one of (i) PBT/PC and PBT plastics, (ii) FR4 PCB, (iii) zinc and (iv) aluminum.

23. The method of claim 1, wherein the adhesive, in its further-cured state, has a bond shear strength greater than 1,000 PSI.

24. The method of claim 23, wherein bond shear strength reduces less than 60 percent at 85 degrees Celsius.

25. A method of assembling a vehicular camera suitable for vehicular use, said method comprising:

providing a lens comprising a plurality of optical elements, wherein said lens is accommodated in a lens barrel, and wherein said lens barrel comprises a cylindrical portion and an annular flange that circumscribes and extends radially from said cylindrical portion, and wherein said annular flange comprises a first mating surface;

providing a camera front housing having a front portion and a rear portion, wherein said front portion comprises a cylindrical portion having a second mating surface;

providing a printed circuit board, wherein an imager is disposed at said printed circuit board;

attaching said printed circuit board at said rear portion of said camera front housing;

providing an adhesive in its uncured state;

dispensing the uncured adhesive to establish a layer of uncured adhesive at one of said first mating surface of said annular flange of said lens barrel and said second mating surface of said front portion of said camera front housing;

positioning said lens barrel at said front portion of said camera front housing by inserting said cylindrical portion of said lens barrel at least partially into a cylindrical passageway of said cylindrical portion of said front portion of said camera front housing until said first mating surface is at said second mating surface with said layer of uncured adhesive therebetween and contacting said first and second mating surfaces;

attaching said first mating surface of said annular flange of said lens barrel to said second mating surface of said front portion of said camera front housing with the adhesive therebetween;

bringing said lens into focus with said imager and optically center-aligning said lens with said imager;

with said lens in focus with said imager and optically center-aligned therewith, initially curing the adhesive to an initially-cured state in an initial radiation curing process that comprises exposure to UV light for a first period of time;

wherein the initially-cured adhesive, as cured via the initial radiation curing process, holds said lens in focus with said imager and optically center-aligned therewith;

after the initial radiation curing process, further curing the initially-cured adhesive to a further-cured state in a secondary curing process;

wherein said further-cured state is achieved within a second period of time;

wherein said second period of time is longer than said first period of time;

wherein, when further cured via the secondary curing process, the further-cured adhesive maintains focus and optical center-alignment of said lens with said imager for use of said camera in a vehicle;

wherein the adhesive, in its further-cured state, has a bond shear strength greater than 1,000 PSI; and wherein bond shear strength reduces less than 60 percent at 85 degrees Celsius.

26. The method of claim 25, wherein the step of dispensing the uncured adhesive comprises dispensing the uncured adhesive so as to establish a layer of uncured adhesive having a thickness less than 0.75 mm.

27. The method of claim 25, wherein the adhesive, in its uncured state, has viscosity at 23 degrees Celsius in the range from 5,000 mPa to 150,000 mPa.

28. The method of claim 25, wherein the step of initially curing the adhesive to an initially-cured state in an initial radiation curing process comprises exposure to UV light in a wavelength range of 320 nm to 440 nm.

29. The method of claim 28, wherein the adhesive, in its uncured state, comprises a one-part, solvent-free, filled epoxy adhesive.

30. A method of assembling a vehicular camera suitable for vehicular use, said method comprising:

providing a lens comprising a plurality of optical elements, wherein said lens is accommodated in a lens barrel, and wherein said lens barrel comprises a cylindrical portion and an annular flange that circumscribes and extends radially from said cylindrical portion, and wherein said annular flange comprises a first mating surface;

providing a camera front housing having a front portion and a rear portion, wherein said front portion comprises a cylindrical portion having a second mating surface;

providing a printed circuit board, wherein an imager is disposed at said printed circuit board;

attaching said lens barrel at said front portion of said camera front housing;

providing an adhesive in its uncured state;

dispensing the uncured adhesive to establish a layer of uncured adhesive at one of said rear portion of said camera front housing and said printed circuit board;

attaching said printed circuit board to said rear portion of said camera front housing with the adhesive therebetween;

dispensing the uncured adhesive to establish a layer of uncured adhesive at one of said first mating surface of said annular flange of said lens barrel and said second mating surface of said front portion of said camera front housing;

positioning said lens barrel at said front portion of said camera front housing by inserting said cylindrical portion of said lens barrel at least partially into a cylindrical passageway of said cylindrical portion of said front portion of said camera front housing until said first mating surface is at said second mating surface with said layer of uncured adhesive therebetween and contacting said first and second mating surfaces;

bringing said lens into focus with said imager and optically center-aligning said lens with said imager;

with said lens in focus with said imager and optically center-aligned therewith, initially curing the adhesive to an initially-cured state in an initial radiation curing process that comprises exposure to UV light for a first period of time;

wherein the initially-cured adhesive, as cured via the initial radiation curing process, holds said lens in focus with said imager and optically center-aligned therewith;

after the initial radiation curing process, further curing the initially-cured adhesive to a further-cured state in a secondary curing process;

wherein said further-cured state is achieved within a second period of time;

wherein said second period of time is longer than said first period of time;

wherein, when further cured via the secondary curing process, the further-cured adhesive maintains focus and optical center-alignment of said lens with said imager for use of said camera in a vehicle;

wherein the adhesive, in its further-cured state, has a bond shear strength greater than 1,000 PSI; and wherein bond shear strength reduces less than 60 percent at 85 degrees Celsius.

31. The method of claim 30, wherein the step of dispensing the uncured adhesive comprises dispensing the uncured adhesive so as to establish a layer of uncured adhesive having a thickness less than 0.75 mm.

32. The method of claim 30, wherein the adhesive, in its uncured state, has viscosity at 23 degrees Celsius in the range from 5,000 mPa to 150,000 mPa.

33. The method of claim 32, wherein the step of initially curing the adhesive to an initially-cured state in an initial radiation curing process comprises exposure to UV light in a wavelength range of 320 nm to 440 nm.

34. The method of claim 32, wherein the adhesive, in its uncured state, comprises a one-part, solvent-free, filled epoxy adhesive.

* * * * *

UNITED STATES PATENT AND TRADEMARK OFFICE
CERTIFICATE OF CORRECTION

PATENT NO. : 9,883,088 B2
APPLICATION NO. : 15/494648
DATED : January 30, 2018
INVENTOR(S) : Brian J. Winden et al.

It is certified that error appears in the above-identified patent and that said Letters Patent is hereby corrected as shown below:

In the Specification

Column 8
Line 45, "06749" should be --OB749--
Line 45, "06787" should be --OB787--

Signed and Sealed this
Thirtieth Day of October, 2018

Andrei Iancu
*Director of the United States Patent and Trademark Office*